United States Patent [19]

Meyrueis et al.

[11] 4,197,010
[45] Apr. 8, 1980

[54] LENGTH STANDARD COMPARISON METHOD AND APPARATUS UTILIZING HOLOGRAPHIC INTERFERROMETRY

[75] Inventors: Patrick Meyrueis; Michel Grossmann, both of Strasbourg, France

[73] Assignee: Agence Nationale de Valorisation de la Recherche (ANVAR), Neuilly-sur-Seine, France

[21] Appl. No.: 839,903

[22] Filed: Oct. 6, 1977

[30] Foreign Application Priority Data
Jan. 17, 1977 [FR] France ................ 77 01160

[51] Int. Cl.$^2$ ............................................ G01B 9/02
[52] U.S. Cl. ....................................... 356/347; 356/358
[58] Field of Search ................... 356/106 R, 109, 4.5, 356/357, 358, 347; 350/3.60

[56] References Cited

U.S. PATENT DOCUMENTS

| | | |
|---|---|---|
| 3,592,548 | 7/1971 | Majkowski ............ 356/109 |
| 3,721,498 | 3/1973 | Narodny ............... 356/109 |
| 3,938,889 | 2/1976 | McKinnis ............. 356/109 |

Primary Examiner—Conrad J. Clark
Attorney, Agent, or Firm—Frishauf, Holtz, Goodman & Woodward

[57] ABSTRACT

A hologram of a wave front reflected by the end of a primary standard, either produced by exposure of a plate in the apparatus or synthesized by computer, is illuminated by a laser with a direct beam and with a beam reflected from the end of a standard to be measured mounted in a reference position. Interference fringes are produced on a screen and the standard to be measured is moved from a reference position to a position in which the reflected wave front coincides with the wave front recorded by the hologram while the fringes are counted to determine the difference in length.

8 Claims, 16 Drawing Figures

LENGTH STANDARD COMPARISON METHOD AND APPARATUS UTILIZING HOLOGRAPHIC INTERFERROMETRY

The present invention concerns a method and apparatus for measuring standards of length.

Apparatus built on the principles of optical interferometry are already known for comparing working standards of length with a primary length standard. Such known systems have only a relative precision and they have little flexibility of use because each time that a comparison must be made, the physical presence of the primary length standard at the place where the comparison must be made is absolutely required.

The present invention has the object to overcome this inconvenience and to provide a method and apparatus making it possible to obtain very high precision of measurement and to carry out the comparison under much simipler conditions.

A further object of the invention is to provide a method and apparatus utilizing holographic interferometry in which a hologram is previously produced and is then utilized for the measurement of a working standard that it is desired to compare with the primary standard of length.

SUMMARY OF THE INVENTION

Briefly, a hologram is made in advance for or with a primary standard of length; this hologram is illuminated by a direct laser beam and by a laser beam that is reflected by an end face of a length standard to be measured, which working standard has its other end face abutted on a reference position stop, and then by using interference fringes obtained by means of the wave front reflected by the length standard under measurement that is illuminated by the laser beam, the difference of length between the primary standard and the working standard is determined. More particularly, the working standard is moved from the reference position into the position in which the reflected wave front coincides with the wave front reconstituted by the hologram, while the interference fringes passing by a detector are counted in order to determine the length difference.

Apparatus according to the invention comprises a frame or base structure, a laser in a fixed position relative to the base, a length standard carrier and a hologram carrier mounted on the base, means for adjusting the position of a standard to be measured on the length standard carrier so that the standard is held with one of its end faces abutted on the reference position stop; a hologram representing a primary standard of length, which hologram is mounted on the hologram carrier so as to be illuminated by a direct laser beam and by the laser beam reflected by the illuminated end face of the standard of length to be measured, means to produce interference fringes from the wave front reflected by the illuminated end face of the length standard and the wave front reconstituted by the hologram, and means for determining on the basis of the interference fringes so produced, the length difference between the primary standard represented by the hologram and the working standard under measurement.

The method and apparatus according to the invention provide many advantages. In the first place, they make possible the performance of measurements through glass of ordinary quality (provided by the bell protecting the length standards, for example), which thus eliminates all the problems of controlled atmosphere. In the second place, the method and apparatus of the invention make it possible to preserve a hologram as a secondary length standard, provided that the reference positions in the apparatus are precisely defined.

Theoretical precision of the order of one thousandth of the wave length of the laser beam is obtainable with the method and apparatus of the invention. By resort to modulation of the reference beam, an order of precision that is superior to the possibilities obtainable with classical interferometers.

The apparatus can be fully automated and thus provided with a great convenience of use. It requires no physical contact and consequently involves no risk of alteration of the measured objects. Finally, it is highly economical for the very high precision available.

In the preferred embodiment, the apparatus utilizes a screen for visualizing the interference fringes, placed in the path of the light that passes through the hologram, and also an optical system located between the hologram and the screen. Preferably the quantity of light passing through the hologram is measured and the result provided on an indicator. A fringe counter is placed behind the screen and its output is provided to a register which is correlated with a control for the displacement of the length standard carrier, so that there can be determined the number of fringes counted during the movement of the reference standard carrier from its reference position to the position at which the wave front reflected from the illuminated end of the length standard coincides with the wave front reconstituted by the hologram.

The invention is further described by way of illustrative and non-limitative example with reference to the annexed drawings, in which.

Figure 1:
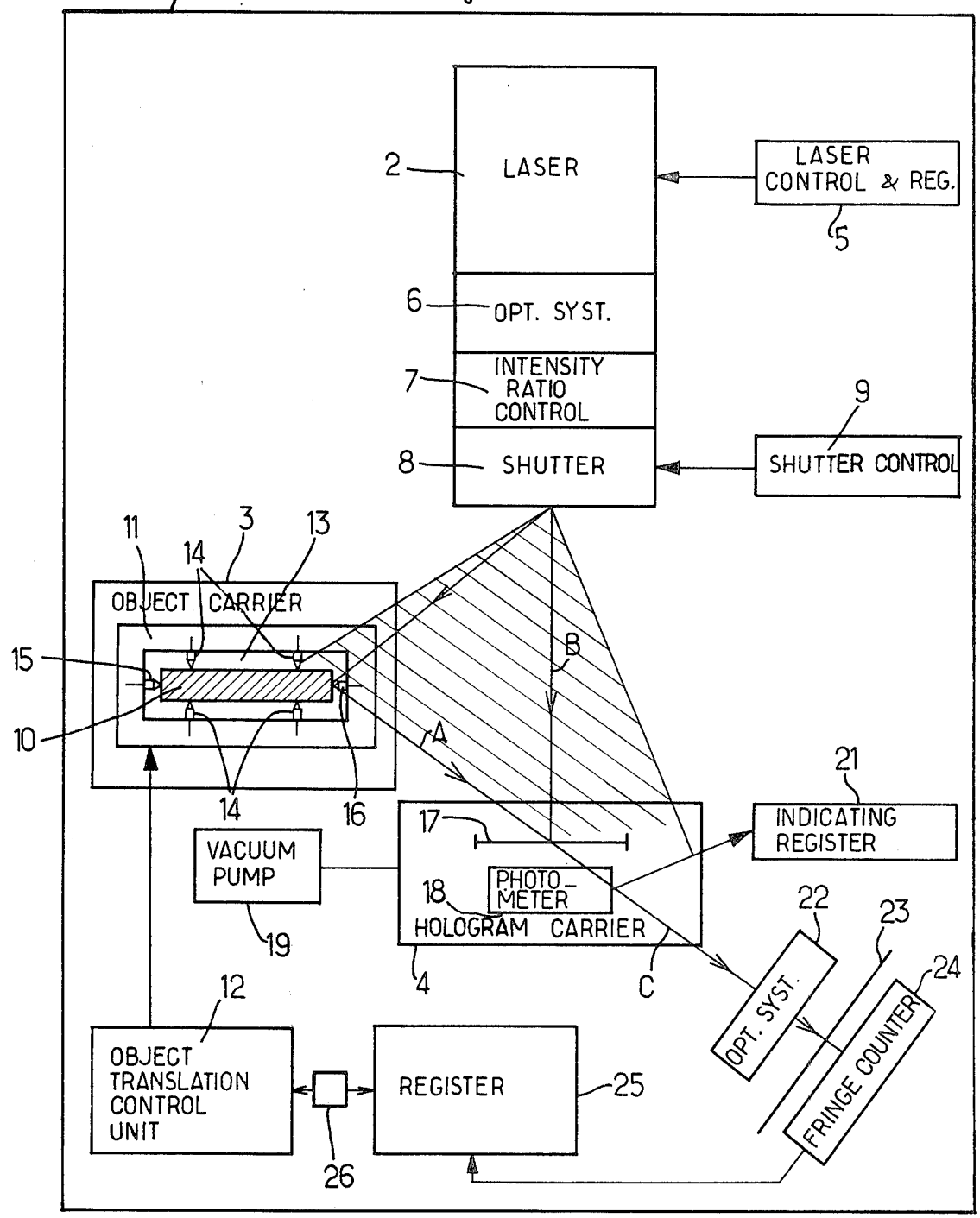
FIG. 1 is a schematic diagram of an apparatus for measuring length standards by holographic interferometry in accordance with the invention.

The complete apparatus for the practice of the invention is represented diagrammatically in FIG. 1. The rectangle 1 represents a base structure for holding all the components in the necessary fixed relations. These components include a laser 2, a length standard carrier plate 3, a hologram carrier plate 4 and various other devices further described below. The base structure 1 is constituted chiefly by an anti-vibration table of great static and dynamic rigidity.

The laser 2 is connected to a control and regulation device 5 for its operation.

Downstream of the output of the laser 2 are mounted an optical system 6 for expansion and filtering of the laser beam and then a control device 7 for adjusting the ratio of intensity of the two interfering beams, namely the object beam A and the reference beam B, as further set forth below.

Finally, there is a shutter 8 operated by its control 9.

The length standard carrier plate 3 supports a translator carriage 11 movable in translation by a precision motor drive (not shown), preferably comprising a stepping motor for each axis of translation, operated by a translation control unit 12. Mounted on the mobile translator carriage 11 is a support 13 equipped for the precisely adjustable fixed setting of the position of a length standard 10. This support 13 has a certain number of point supports including lateral point supports 14, a rear end point support 15 which constitutes a reference position stop and a front end point support 16, at least one of each opposed pair of which is preferably equipped with a micrometer tightening adjustment. The length standard 10 may be a primary standard of length for producing a hologram, as further described below, but generally it will be a working standard of length which is to be measured by means of a previously prepared hologram of a primary length standard. In each case, the length standard is precisely held in place by point supports 14,15 and 16, the rear end support 15 always constituting a reference position stop for comparative measurements.

When the length standard 10 is a working length standard, a hologram 17 made from a primary length standard is mounted on the hologram carrier plate 4. Also mounted on the hologram carrier plate 4 is a photometer for measuring hologram exposures, which operates an indicating register 21, which may also be connected to an output interface unit (not shown) for recording or data processing. The hologram 17 is firmly held on a vacuum support (not shown in FIG. 1) for which the necessary vacuum is provided by the vacuum pump 19.

The light beam C is the light beam, in the final direction of the light beam A, that has passed through the hologram 17. At any cross-section of this beam, there are interference fringes that may be measured. This beam passes through an optical system 22 and illuminates a screen 23 which serves to make the interference fringes visible.

Behind the screen 23 there is disposed a fringe counter 24 the output of which is provided to a register 25 that stores and/or indicates the fringe count and provides an output to an interface unit 26 for correlating the fringe count with the movement of the translation carrier 11 directed by the control unit 12, so that the measurement may be conveniently automated.

OPERATION

For comparing a working length standard and a primary standard of length, both standards, of course, must have perfectly polished ends. The primary standard is first mounted on the translator carriage 11, held in abutment on the reference position stop 15 by the other point supports 14 and 16. A photographic plate for preparing the hologram 17 is mounted on the vacuum support on the hologram carrier plate 4. The laser 2 is then caused to emit a laser beam which at the exit side of the shutter 8 consists on the one hand of an object beam A and, on the other hand a reference beam B.

The object beam A falls on the righthand end face of the standard 10 and is reflected in the direction of the photographic plate 17. This plate also receives the direct reference beam B. The beams A and B interfere at the plane of the photographic emulsion of the plate 17 and the interference pattern produced and recorded in the emulsion constitutes a hologram of the wave front reflected by the standard 10. The photometer 18 and its indicating register 21 may be used to assure the correct exposure of the plate. The exposed plate is then developed and the plate with the developed hologram is then replaced in its original position (or indeed, it may be developed in place if a suitable developing system is provided on the hologram carrier 4).

The primary standard is then replaced by the working standard to be measured on the translation table 11 of the object carrier plate 3. It may be assumed that the working standard is made so as to differ very little in length from the primary standard with which it is to be compared. The working standard, now precisely held in the position 10 which is the same as the position previously occupied by the primary standard, abutted against the reference position stop 15, is now illuminated, so that the wave front reflected by the working standard will now interfere with the hologram reconstituting the wave front reflected by the primary standard when it was at the place of the working standard. Resulting interference fringes are formed on the visualization screen 23 and these interference fringes characterize the difference in length between the primary standard and the working standard.

When the interference fringes appear on the screen 23, the next step is to determine the difference in length between the working standard and the primary standard of length by counting fringes. For this purpose, the object translation control unit 12 is set into operation to produce a displacement of the translation carriage 11 such as to produce the interference condition indicating that the two wave fronts, namely the one reflected by the standard 10 mounted on the translation carriage and the one represented by the hologram, which last was the one reflected by the primary standard when it was mounted in place, are superposed. During this movement of the translation carriage, the fringes passing the input of the fringe counter 24 are counted and the state of the count register 25 when the wave front superposition situation occurs indicates the difference in length between the primary standard and the working standard.

It can be seen from the foregoing explanation that the method and apparatus of the invention make it possible to preserve a hologram 17, which is in essence a recording of the length of the primary standard, as a secondary standard with which working standards can very conveniently be compared in a working position.

In the foregoing example of the method of the present invention, the hologram 17 was obtained at the outset by placing a primary standard of length on the support 13 of the translation carriage 11 and illuminating the end of the primary standard with the laser of the apparatus.

In accordance with a variation of the method of the invention, however, there may be used as a source of the reference wave front a hologram constructed by a computer. By a method that has by now become classic (Applied optics Volume 16 No. 2 Feb. 1972) it is possible to produce by computer a modular pattern constituting a virtual hologram that synthesizes a wave front that may be a plane wave front that has both the inclination and the phase (position) that are desired. This synthetic hologram can also serve to verify the flatness of the end face of the length standard, because deviations from flatness are translated into easily analyzable distortions of the fringes. This method can be extrapolated, because of the presence of specular reflection, for the verification of nonplanar simple surfaces that can be compared with models produced by a computer, such as, for example, spheres and cylinders. Difficulties arise, however, in such cases from the geometrical and mechanical positioning of the object. These difficulties can be resolved by using x-y translation tables that make it possible to distinguish between the fringes produced by different positions and those produced by differences of dimension, by studying the modificaton of these fringes produced by the displacement of the objects mounted in the translation carriage 11 of the object carrier plate 3. Such a procedure makes it possible thereafter to provide precise positioning, after which it becomes easier to examine the differences in dimension by moving the fringes.

Figure 2:
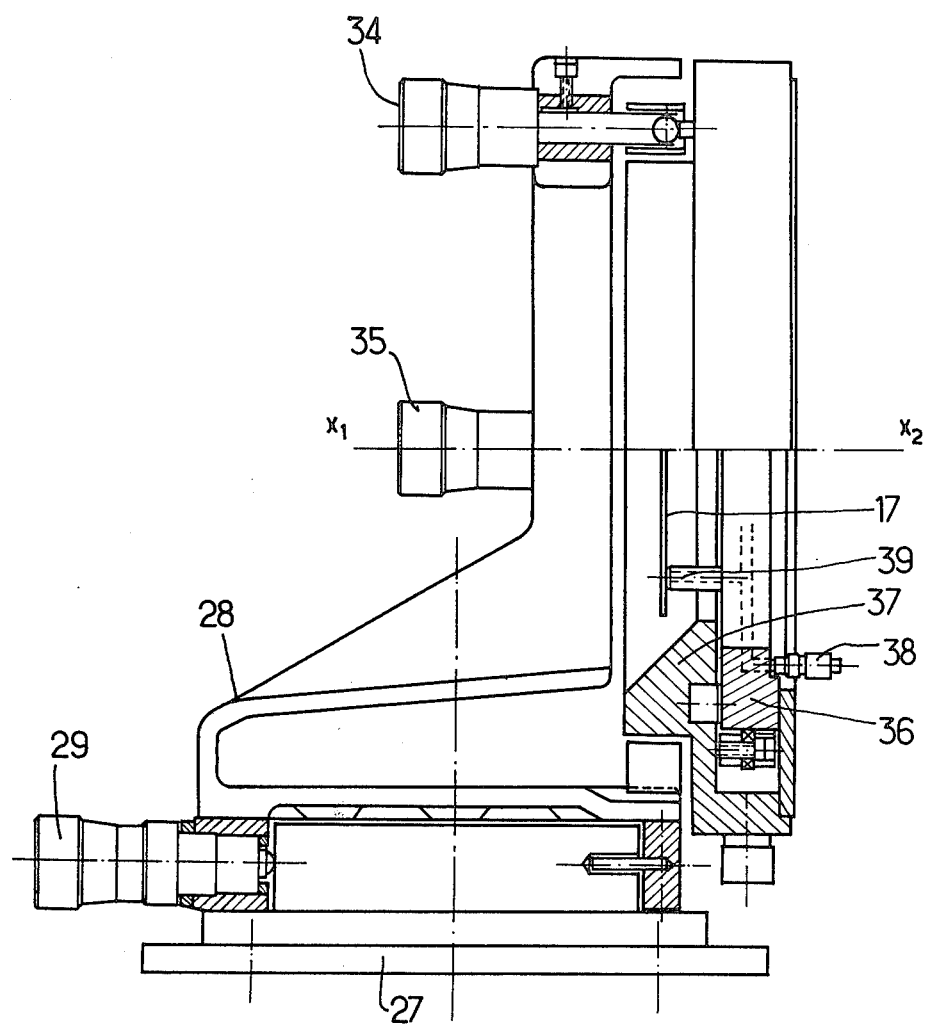
FIG. 2 is a side elevation.
Figure 3:
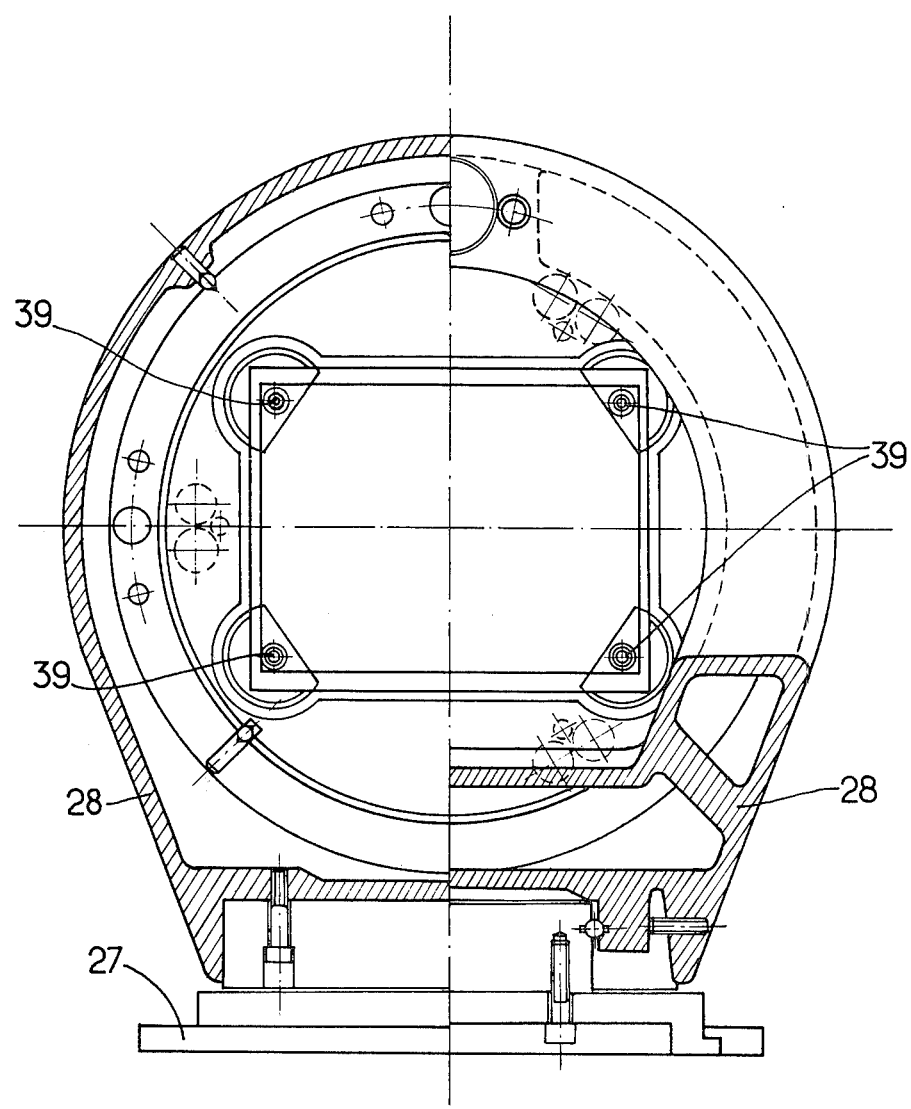
FIG. 3 is a composite of front sectional views of a particular form of hologram carrier useable in the apparatus of FIG. 1.
Figure 4:
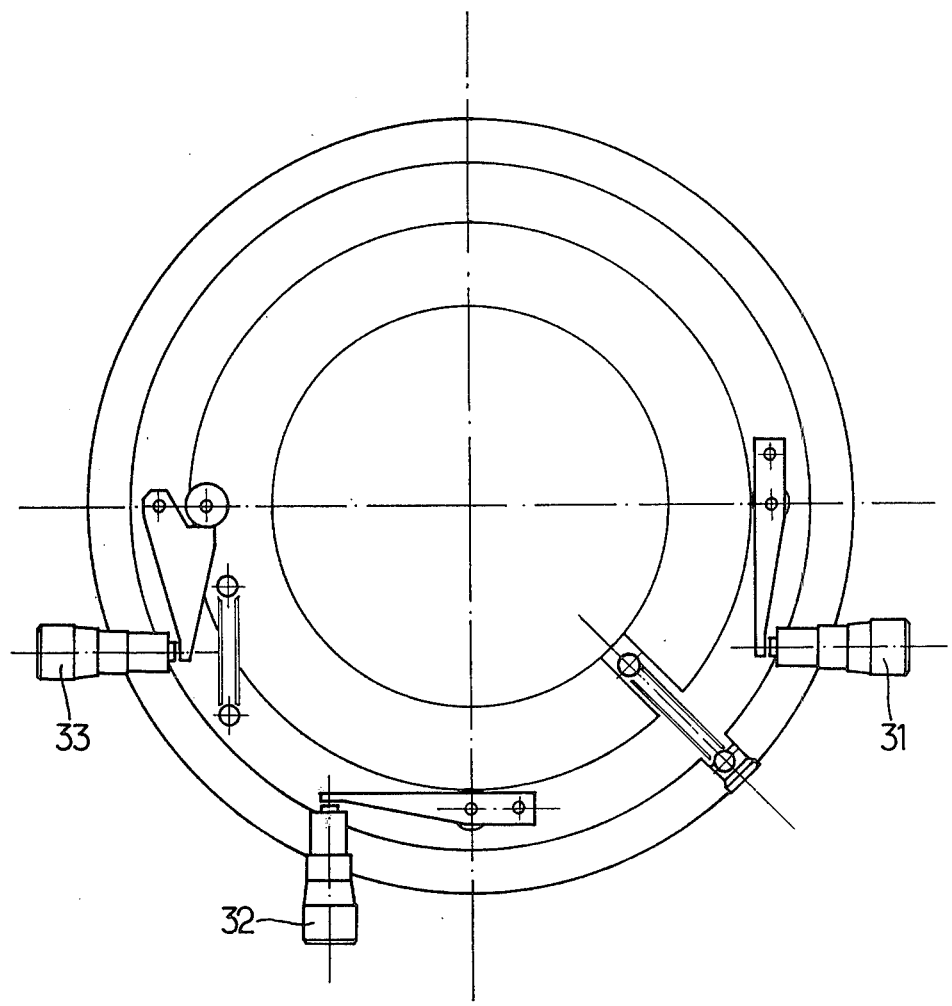
FIG. 4 is a detail diagram of some of the adjustments of the hologram carrier of FIGS. 3 and 4.

FIGS. 2, 3 and 4 are different views of a particular embodiment of the hologram carrier plate 4 and its hologram support structure 13 of FIG. 1. This embodiment of the hologram carrier comprises a table 27 on which is movably mounted a frame 28 of which the position can be adjusted in three mutually perpendicular directions X, Y and Z respectively by means of screw adjusting knobs 29, 31 and 32, of which the first appears in FIG. 2 and the last two in FIG. 4. Three other screw adjusting knobs, 33, 34 and 35, of which the last two appear in FIG. 4 and the first in FIG. 4, are provided to control the inclination of the hologram carrier proper 36, likewise with reference to the three mutually perpendicular directions X, Y and Z. The hologram carrier 36 is itself rotatably mounted about a horizontal and longitudinal (of the beam) axis x1-x2 which is parallel to the direction X, in a circular bed 37 pivotally mounted about three axes in the frame 28. The angular position of the circular bed 37 is adjustable with reference to the three directions X, Y and Z by means of the previously mentioned screw adjusting knobs 33, 34 and 35. The hologram carrier 36 is hollow and is connected at one side to a vacuum source, not shown in these figures, by a tube connection 38. On its other side, the hologram carrier 36 presents four suction pillars 39 connecting the vacuum source with the interior of the hollow hologram carrier 36 and extending parallel to the axis x1-x2. They are disposed at the corners of a rectangle as shown in FIG. 3. Thus, the hologram 17 is maintained in place on the pillars 39 by suction as soon as the vacuum is provided.

Figure 5:
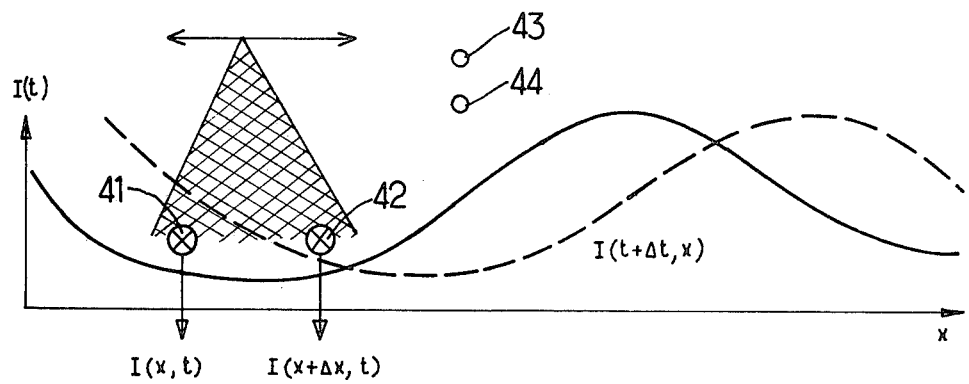
FIG. 5 is a graph for explaining the manner in which interference fringes are observed and counted.
Figure 6:
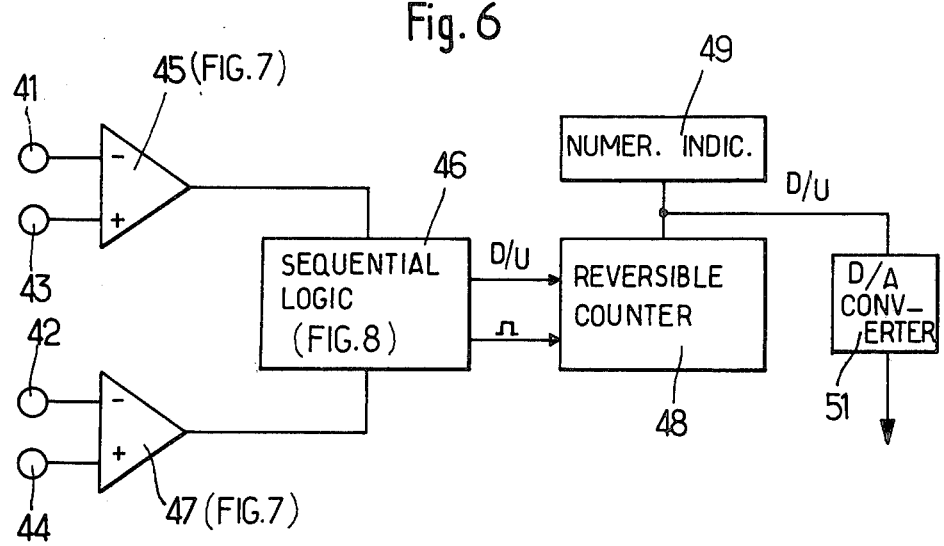
FIG. 6 is a block diagram of the fringe counter of the apparatus of FIG. 1.

FIGS. 5-9 illustrate an example of an embodiment of the fringe counter 24 and its circuits. As shown at the left of FIG. 6, which is an overall block diagram of the fringe counter, this device has four photodiodes at its input, namely two photodiodes 41 and 42 placed side by side, as illustrated in FIG. 5, in the interference field where a fringe is formed and two other photodiodes 43 and 44 placed outside the fringes to measure ambient light and thus to serve as a reference. The detection photodiode 41 and the reference photodiode 43 are respectively connected to two inputs of a first differential amplifier 45 (FIG. 6) of which the output is connected to a first imput of a sequential logic unit 46. The second detection photodiode 42 and the second reference photodiode 44 are respectively connected to two inputs of another differential amplifier 47, of which the output is connected to a second input of the sequential logic circuit 46. This sequential logic circuit processes the signals produced by the two amplifiers 45 and 47 and produces at its output a count-down or a count-up order pulse D/U that is applied to a reversible counter 48 according to the sense in which the interference fringes run during the movement of the translation carriage of the standard carrier. The output signal of this reversible counter 48 is applied, on the one hand, to a numerical indicator 49 and, on the other hand, to a digital-to-analog converter 51.

Figure 7:
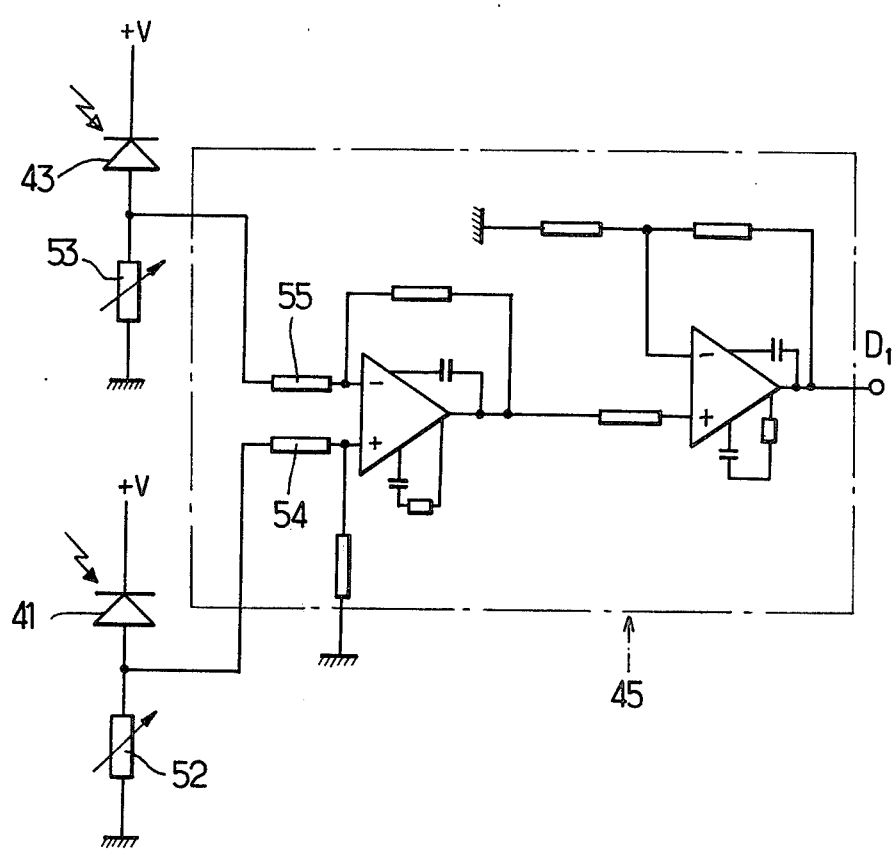
FIG. 7 is a diagram of a differential amplifier useable in the circuit of FIG. 6.

FIG. 7 shows in detail the manner in which the interference fringes are detected. The detection and reference photodiodes 41,43 are respectively connected in series with potentiometers 52 and 53 for adjusting sensitivity and are also connected with a source of steady voltage +V. The two inputs of the differential amplifier 45 are respectively connected through resistances 54 and 55 to the junction points between the detection photodiode 41 and the potentiometer 52 in one case and of the reference photodiode 43 and the potentiometer 53 in the other case. The reference photodiode 43 thus detects the ambient light and provides a reference signal which is applied at the inverting input of the amplifier 45. The detector photodiode 41 that is located in the fringe pattern provides a measurement signal applied to the noninverting input of the differential amplifier 45. In fact, as shown in FIG. 7, the differential amplifier 45 comprises two operational amplifiers of type SN 72709 made by Texas Instruments, compensated in frequency and making it possible to obtain, with a gain of 2,000, a voltage level compatible with TTL logic. At the output of the differential amplifier 45 there is obtained a +5V signal when the detection photodiode 41 is located in a bright fringe and, on the other hand, a OV signal when the same diode is in a dark fringe. In the latter case, detection diode 41 gets the same signal as the reference photodiode 43 and the differential amplifer consequently produces a 0 output voltage, it is thus possible to operate with binary logic.

Figure 8:
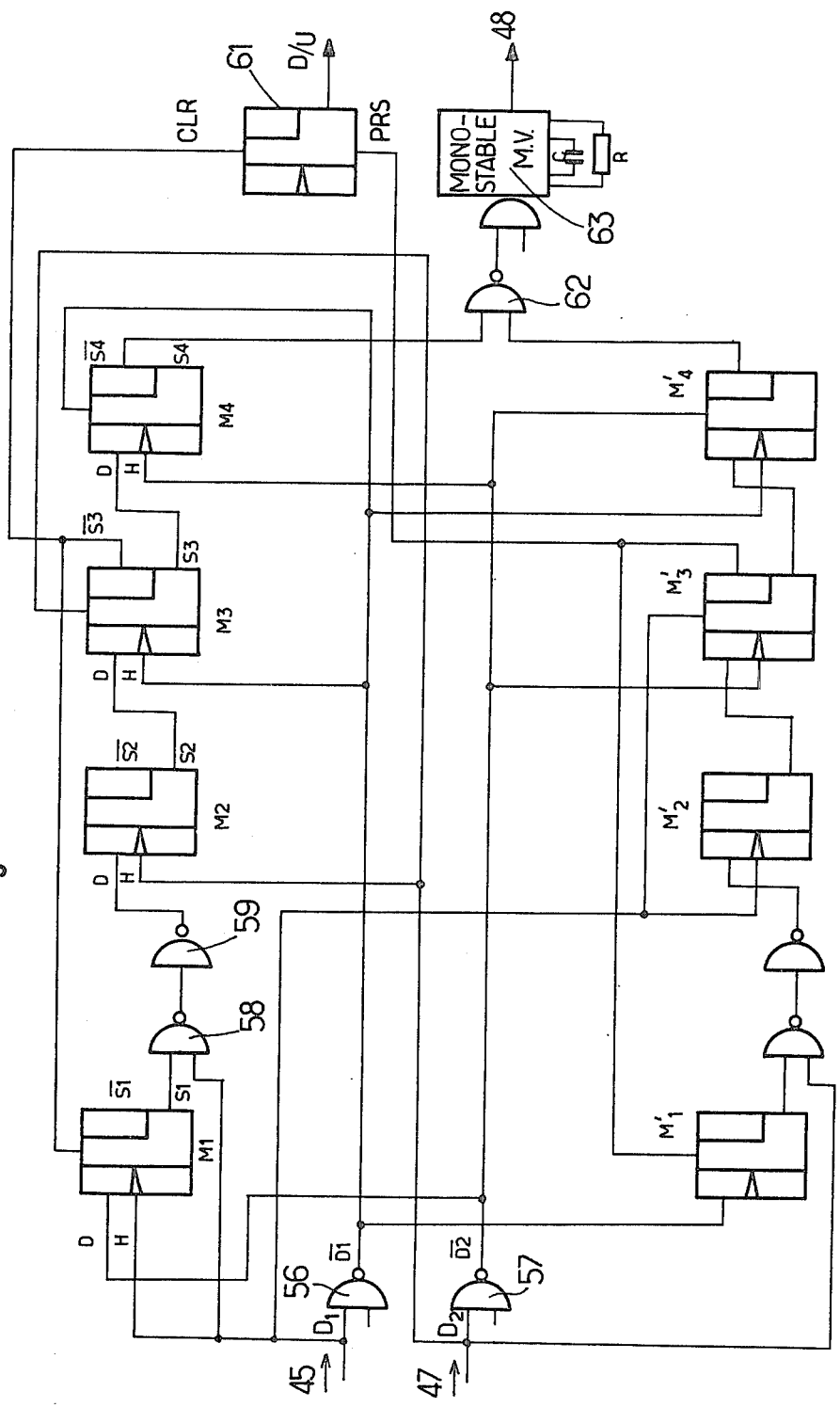
FIG. 8 is a diagram of the sequential logic circuit used for providing count signals to the reversible counter of the apparatus of FIG. 1, and FIGS. 9a,9b,9c . . . 9h are a series of graphs illustrating the manner in which the sequential logic circuit of FIG. 8 is able to keep track of the direction of count of fringes.
Figure 9:
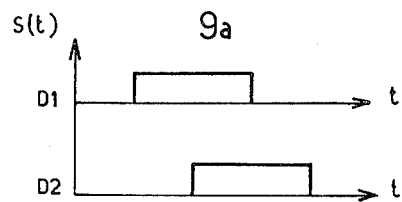
Figure 9:
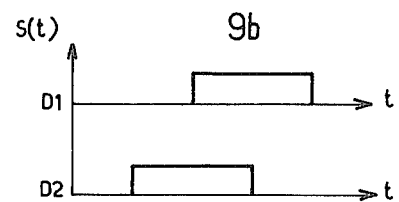
Figure 9:
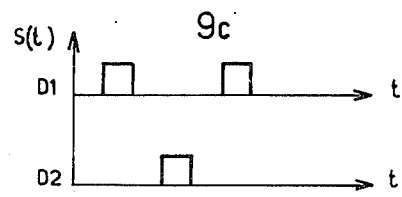
Figure 9:
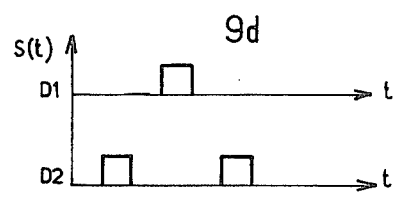
Figure 9:
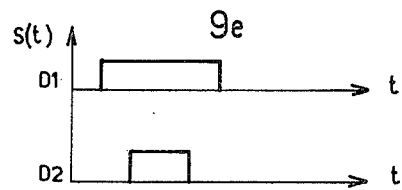
Figure 9:
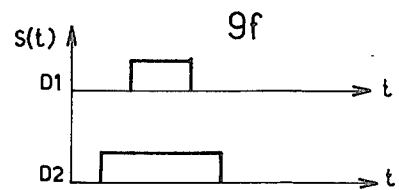
Figure 9:
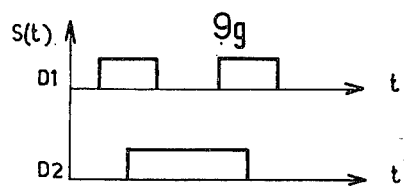
Figure 9:
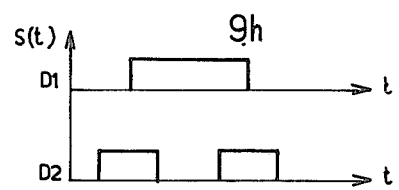

The organization of the sequential logic unit 46 is shown in FIG. 8.

Since the active photodiodes 41 and 42 are located side by side in a dark or a bright fringe (FIG. 5), when the fringes run by, a succession of logic states of the amplifiers is produced. If A and B represent two photodiodes 41 and 42 in the logic state 1 (both illuminated and if A and B represent the photodiodes in the logic state 0 (both in shadow), the running by of a complete fringe is given by the following sequence: (A, B) ; (A,B) ; (A,B) ; (A,B) ; (A,B). The problem of recognizing the sense in which the fringes run by is thus a problem of sequential logic and it is necessary to keep track of all of these possible successions of logic states that do not correspond to the passing by of a complete fringe.

Since the passage of a fringe gives rise to a succession of four states of the doublet (A, B) it is necessary to provide four memories M1,M2,M3,M4 for one sense (direction) of passage and four other memories M'1,M'2,M'3,M'4 for the other sense. Multivibrators (flipflops) of type "D" (Texas Instrument type SN 7474) are utilized for these memories which have an output of logic level 1 if a pulse is provided to the clock input when the input D is at the level 1 (the input D determines whether or not the memory will switch). The memory M1 receives at its clock input H the signal D1 that is provided by the differential amplifier 45 in response to the first detector photodiode 41. The signal D1 of the differential amplifier 45 is applied to one input of a NAND gate 56 and likewise the signal D2 provided by the other differential amplifier 47 is applied to one input of another NAND gate 57. The signal D2 is applied to the input D of the memory M1. In consequence, this memory switches in response to the combination (D1,D2).

In order to cause the memory M2 to switch in response to the next combination, it is necessary to assure that the unfavorable cases illustrated by FIGS. 9c and 9d are not present. This is necessary to provide coincident detection while making sure that the photodiode 41 is always at the level 1 (signal D1) after switching of the memory M1. The memory M2 is capable of switching for the combination (D1,D2), the signal D2 being applied to the clock input H. A coincidence circuit formed by two NAND gates 58 and 59 in cascade is connected to the D input of the memory M2. An input of the NAND gate 58 is connected to the output S1 of the memory M1 while the other input receives the signal D1.

The memory M3 switches for the combination (D1,D2). The output S2 of the memory M2 is applied to the D input of the memory M3, while the inverse of the signal D1, i.e. D1, is applied to the clock input H of the memory M3.

When this stage is reached, the count-up or countdown order D/U is prepared for the reversible counter 48 (FIG. 6) by means of a bistable multivibrator (of type D) controlled by its "preset" input PRS and its "clear" input CLR. The complementary output S3 is applied to the input CLR while that of the corresponding memory M'3 is applied to the input PRS, because it is the logic level 0 that is active at these inputs. It is necessary, moreover, to set to 0 the memories that have already operated and that play no further role in the sequence of combinations. The inverse (complementary) output S3 of the memory M3 resets to 0 the memory M1. The next combination (D1, D2) produces the switching of the fourth memory M4 of which the D input is connected to the S3 output of the memory M3, while the inverse of D2, i.e. D2, is applied to its clock input H. The complementary output S4 of M4 is connected to one input of a NAND gate 62 of which the other is connected to the corresponding output of the memory M'4. This NAND gate 62 controls a monostable multivibrator 63 that furnishes a counting pulse that is applied to the reversible counter 48.

The resetting of the memory M2 to 0 is automatically produced in response to the combination (D1,D2). The memory M3 is itself reset to 0 by the 0 level of D2, while the memory M4 is reset to 0 by the 0 level of D1 at the beginning of the next input combination.

The process is the same for contrarily directed passage of the fringes, the roles of D1 and D2 being in this case interchanged (reversed), the difference being in the output of circuit 62.

The reversible counter 48 is preferably constituted of integrated circuits of Texas Instruments type SN 74 190. These are synchronous reversible BCD (binary coded decimal) counters. The outputs of these counters are applied to light-emitting diode indicators of the seven-segment type VS 10 10 made by AMP FM, which constitute the indicating register 49.

The digital/analog converter 51 of the circuit of FIG. 6 is in the present example of the DATEL type DAC CV 12D. This converter provides at its output a voltage from 0 to 10 V at steps of 10mV. This provides 1,000 measuring points. It is the three first decades of the four decade reversible counter 48 that are applied to the BCD inputs of the converter 51.

Although the invention has been described with reference to a particular illustrative example, it will be understood that modifications and variations are possible within the inventive concept.

I claim:

1. A method of measuring the length of a working length standard by means of a hologram of a reference standard of length already precisely known, comprising the steps of:
   illuminating said hologram by a direct laser beam used as a reference beam and at the same time illuminating said hologram by a laser beam reflected from an end face of said working length standard to be measured while the other end face thereof is abutted on a reference position stop; and
   displacing longitudinally said working standard and simultaneously counting the interference fringes produced by said reflected and hologram-affected direct laser beams which pass by a reference point as said working standard is moved in either direction between its initial position abutted on said stop and a position in which the reflected wave front coincides with the wave front reconstituted by the hologram.

2. A method as defined in claim 1, in which the step of making said hologram is performed by constructing a hologram by means of a computer.

3. A method as defined in claim 1, in which a preliminary step of making said hologram is performed by performing the following substeps:
   placing a primary or secondary length standard with one of its end faces abutting said reference position stop and its other end face in position to be illuminated by a direct laser beam;
   exposing a photographic plate to the interference of a laser beam reflected by said illuminated face of said primary or secondary length standard with a direct laser beam from the same source; and
   developing the exposure so made;
   whereafter the hologram so formed is mounted in the same place in which said plate was exposed and a working length standard is substituted for said primary standard of length for measuring the difference in length by the method set forth in claim 1 with illumination by said laser.

4. Apparatus for measuring working standards of length comprising, in combination:
   a base structure;
   a laser in fixed position relative to said base structure;
   a working standard carrier mounted adjustably on said base structure and having a reference position stop;
   a hologram carrier mounted adjustably on said base structure;
   means for precisely mounting the position of a length standard on said working standard carrier, so that one end face of said length standard is abutted on said reference position stop and its other end face is illuminable by said laser in a manner to reflect a beam from said laser towards said hologram carrier;
   a hologram of a reference standard of length mounted on said hologram carrier in such a way as to be illuminable by a direct beam from said laser and also by a beam from said laser reflected by the illuminated face of a length standard mounted on said working standard carrier;

means for detecting interference fringes produced by the wave front reconstituted by said hologram and the wave front reflected by said illuminated end face of a length standard in said working standard carrier; and means for displacing said working standard lengthwise and for counting said interference fringes successively detected by said detecting means as said working standard is so displaced.

5. Apparatus as defined in claim 4, in which said working standard carrier comprises:

a precision translation carriage equipped with at least one motor drive for precise translation movement;

a precision mounting support having a set of mounting probes carried on said support for standards of length mounted on said carriage, including a plurality of lateral mounting probes, at least one forward mounting probe and at least one rear mounting probe, the latter constituting said reference position stop.

6. Apparatus as defined in claim 4, in which light measuring means are mounted on said hologram carrier for measuring the amount of light transmitted through said hologram and in which indicating means are operatively connected to the output of said light measuring means.

7. Apparatus as defined in claim 4, in which said means for detecting interference fringes comprise a screen for making said fringes visible, and in which an optical system is interposed between said hologram and said screen, and in which said fringe counting means is on the opposite side of said screen from said hologram.

8. Apparatus as defined in claim 7, comprising also means connected to said fringe counter for registering the count of fringes counted by said counter, and means for correlating the fringe count indicated by said register with the displacement of said working standard carrier so as to enable the determination of a fringe count corresponding to the movement of said working standard carrier necessary to displace the latter in either direction between a reference position and a position in which the wave front reflected by the standard in said standard carrier is congruently superimposed upon the wave front reconstituted by said hologram.

* * * * *